(12) United States Patent
Metral-Boffod et al.

(10) Patent No.: US 11,607,740 B2
(45) Date of Patent: Mar. 21, 2023

(54) WIRE ELECTRICAL DISCHARGE MACHINING METHOD

(71) Applicant: Agie Charmilles SA, Losone (CH)

(72) Inventors: Sandrine Metral-Boffod, Saint-Blaise (FR); Alain Reverchon, Reignier (FR); Fabrice Jaques, Satigny (CH)

(73) Assignee: Agie Charmilles SA, Losone (CH)

( * ) Notice: Subject to any disclaimer, the term of this patent is extended or adjusted under 35 U.S.C. 154(b) by 427 days.

(21) Appl. No.: 16/809,702

(22) Filed: Mar. 5, 2020

(65) Prior Publication Data

US 2020/0298328 A1    Sep. 24, 2020

(30) Foreign Application Priority Data

Mar. 22, 2019    (EP) .................................... 19164591

(51) Int. Cl.
*B23H 7/20*    (2006.01)
*B23H 1/02*    (2006.01)
*B23H 7/04*    (2006.01)
*B23H 7/06*    (2006.01)

(52) U.S. Cl.
CPC ................. *B23H 7/20* (2013.01); *B23H 7/04* (2013.01); *B23H 7/06* (2013.01); *G05B 2219/45043* (2013.01)

(58) Field of Classification Search
CPC ... B23H 7/20; B23H 1/02; B23H 7/06; B32H 7/04; G05B 2219/45043
See application file for complete search history.

(56) References Cited

U.S. PATENT DOCUMENTS

| 4,603,391 A | * | 7/1986 | Inoue | G05B 19/4163 |
| | | | | 700/193 |
| 4,963,711 A | * | 10/1990 | Obara | B23H 7/04 |
| | | | | 219/69.12 |
| 2013/0112658 A1 | * | 5/2013 | Kudou | B23H 7/20 |
| | | | | 219/69.11 |

(Continued)

FOREIGN PATENT DOCUMENTS

| EP | 3446820 A1 | 2/2019 |
| JP | 2000158235 A | * 6/2000 |

OTHER PUBLICATIONS

Machine translation of Japan Patent document No. 2000158235-A, Jun. 2022 (Year: 2022).*

(Continued)

*Primary Examiner* — Geoffrey S Evans
(74) *Attorney, Agent, or Firm* — Harness, Dickey & Pierce, P.L.C.

(57) ABSTRACT

A method for the monitoring of a wire electrical discharge machining (WEDM) process, the method comprising the steps of: setting a unit observation length for the signal acquisition, continuously acquiring at least one process signal which is representative of an amount of material removed by at least one discharge and the position (X;Y) of said at least one discharge, and determining, based on said at least one process signal and one or more properties of a current machining, a cumulated amount of material removed per unit observation length along a machining path, including amounts of material removed by travelling in a forward cutting direction and amounts of material removed by travelling in a reverse cutting direction.

15 Claims, 3 Drawing Sheets

(56) References Cited

U.S. PATENT DOCUMENTS

2018/0266935 A1    9/2018    Jaques et al.

OTHER PUBLICATIONS

Andrzej Werner, "Method for enhanced accuracy in machining curvilinear profiles on wire-cut electrical discharge machines", Bialystok University of Technology, Precision Engineering vol. 44, (Oct. 21, 2015) pp. 75-80.
Extended Search report for European Application No. 19164591.01 dated Sep. 5, 2019 (8 pages).

* cited by examiner

WIRE ELECTRICAL DISCHARGE MACHINING METHOD

CROSS-REFERENCE TO RELATED APPLICATIONS

This application claims the benefit and priority of European Patent Application No. 19 164 591.0 filed Mar. 22, 2019. The entire disclosure of the above application is incorporated herein by reference.

FIELD OF THE INVENTION

The invention relates generally to a wire electrical discharge machining method and more specifically to a method for the monitoring of a wire electrical discharge machining process by determining a cumulated amount of material removed along a machining path.

BACKGROUND OF THE INVENTION

Wire electrical discharge machining (WEDM) technology has made great progress since its inception. Concerns regarding surface integrity of the workpieces machined by this electro-thermal process, in particular the reduced fatigue strength by reason of the damaging of workpiece surface has been addressed by manufacturers. The process has been improved in particular by enhanced generators which are able to provide very short high current amplitude pulses, and by a suitable application technology. It is reminded that the WEDM process sequence comprises a main cut and one or more trim cuts or passes, and that the succession of these trim cuts, in particular the pulse energy and offset for each individual pass is adapted such as to remove at least partially the thermally affected material layer caused by the preceding pass. By progressively reducing the pulse energy and the amount of material to be removed for a pass, the heat affected zone (HAZ) and roughness are progressively reduced. If the HAZ generated by the previous pass is not completely removed by the current pass, a trace of damage may remain to the finished workpiece.

WEDM technology is used to manufacture critical parts, for instance aerospace parts such as fir tree slots in turbine discs. This shows how the inherent capabilities and flexibility of the WEDM process can now be applied advantageously in production environment. For many such manufacture critical parts traceability is mandatory. To this effect, it is desirable that manufacturing equipment and manufacturing environment have the capability to collect process critical data and make them available for quality monitoring, but also for process improvement.

Currently certain monitoring and tracking functions are already available with many WEDM. For instance, the applicant has presented E-tracking features at the conference 'Factory of the Future' EPHJ—2014, held at the Palexpo-Geneve on the 18.06.2014. From this E-tracking it is known to monitor a process relevant signal such as the cutting speed along the machining path, as a function of the curvilinear abscissa of the machining path. The scope of such E-tracking is to provide an indicator for the quality certification, aiming to zero-default manufacturing. Secondly this is also intended to remediate to the differences between machines in term of cutting speed, and to be able to compare monitored signals of series of parts machined on the same machine and/or different machines. In this E-tracking method the tracking starts from a starting position on the part, then signals are monitored all along the machining path. Then a graph signal as a function of the machining path is drawn.

The WEDM is typically a servo-controlled process in which the feeding speed of the tool in cutting direction depends on the amount of material to remove. The speed is adapted such as to maintain the desired distance between the wire and the workpiece, such as to conduct a stable WEDM process. Servo-controlled speed is typically used with a main cut and first trim cuts, whereas fixed speed is often used with finishing trim cuts. With servo-controlled feed the cutting speed varies continuously along the cutting path. Also, with bad machining conditions, in particular with short circuit, the wire electrode is controlled such as to slow down or return along the machining path; in the last case the wire may move back and then forward again, and thus travel more than once along the same section of path, whereby additional material is removed.

In case of a servo-controlled process, the axis velocity is determined by a signal representative of the gap width, such as the ignition delay time or mean voltage or a pulse classification scheme. A cutting speed may change for several reasons, such as: varying amount of material to be removed (stepped part), bad flushing conditions (loss of flushing pressure), excessive contamination of the gap (high workpieces), etc. On the other hand, some short circuit solving methods include that the wire is retracted along the trajectory of the machining path. For instance the generator is disconnected during a reverse movement and is reconnected at or during the approaching, or the generator remains connected during both, the reverse movement and the approaching movement, or else.

State of the art process monitoring methods are not capable to deal satisfactorily with variable cutting speed, and in particular with retracting movements, because these methods do not provide a real picture of the amount of material which has effectively been removed at a given position along the path. Also, feedback signals from the WEDM process are substantially electrical signals which are interpreted and do not provide any information regarding the real thickness of the removed material of the pass nor real size of the machining.

SUMMARY OF THE INVENTION

The present invention discloses a method by which the amount of material removed during the WEDM process is determined, based on simple acquisition of process signals in space, so that the real thickness of the removed material of the pass is determined.

In the present invention, a method for the monitoring of a wire electrical discharge machining (WEDM) process comprises the steps of:

setting a unit observation length for the signal acquisition, continuously acquiring at least one process signal which is representative of an amount of material removed by at least one discharge and the position (X;Y) of said at least one discharge, determining, based on said at least one process signal and one or more properties of a current machining, a cumulated amount of material removed per unit observation length along a machining path, including amounts of material removed by travelling in a forward cutting direction and amounts of material removed by travelling in a reverse cutting direction.

In a preferred embodiment, the method for the monitoring of a wire electrical discharge machining process comprises the steps of:
  setting a unit observation length for the signal acquisition,
  continuously acquiring at least one process signal which is representative of an amount of material removed by at least one discharge and the position (X;Y) of said at least one discharge,
  determining the amount of material removed by the at least one discharge, based on said at least one process signal and one or more properties of a current machining,
  determining a cumulated amount of material removed per unit observation length along a machining path, including amounts of material removed by travelling in a forward cutting direction and amounts of material removed by travelling in a reverse cutting direction.

Here the cumulated amount of material removed per unit observation length along the machining path by the wire electrical discharge machining process is determined, including the amounts of material removed by travelling in a forward cutting direction and the amounts of material removed by travelling in a reverse cutting direction. In this way, the cumulated amount of material removed is accurately determined, and the determined values can be compared with reference values to qualify the machining and the process becomes traceable.

Another aspect of the present invention is directed to the representation of the cumulated amount of material removed per unit observation length along the machining path which is represented and displayed either in a graph, along a curvilinear abscissa of the machining path, or along a geometry of machining in the X/Y plane (2D), or along the geometry of machining in the X/Y/Z space (3D). The cumulated amount of material removed per unit observation length along the machining path is represented and displayed either during the machining or at the end of the machining.

This provides an overall picture and an instrument for the assessment of a successful (or unsuccessful) completion of a part of the machining or the entire machining, and highlights possible machining defects.

Further aspects are set forth in the dependent claims, the following description and the drawings. Other features are inherent in the methods and products disclosed or will become apparent to those skilled in the art from the following detailed description of embodiments and its accompanying drawings.

DETAILED DESCRIPTION OF THE INVENTION

The present invention provides enhanced information about the amount of material removed along the machining path of a WEDM machining. This information is determined for one or more passes, for instance a main cut and subsequent trim cuts or finishing passes. The information about the amount of material removed along the machining path in each pass is very relevant to assess the quality of the WEDM process, and therefore it can be used to certify the quality of certain machined parts. Said information can be recorded for traceability purposes. Further it can be used for instance as an input value for automatic sorting systems in production environment, for the improvement of the machining or/and as an input value to training data for machine learning.

The representation of values as a function of the position along the machining path has some clear advantages over a representation of values as a function of time, because position can increase and decrease. Thus the focus is the result on the part machined.

At this point it is to be mentioned that the machining path specifies the path of the tool center point, and not the length of the machined profile. Generally, the machining path does not correspond to the length of the machined profile. In an internal angle, the length of the machined profile is longer than the corresponding machining path. Respectively, it is shorter in an external angle.

It is understood that for the correct representation, the amount of material removed per unit observation length is preferably referred to the length of the machined profile. Thus, the present specification implicitly includes the machined profile when referring to the machining path.

The method for the monitoring of a wire electrical discharge machining (WEDM) process disclosed by the present invention comprises a first step in which a 'unit observation length' dL (quantum of length) for the signal acquisition is set.

This unit observation length determines the resolution of the monitoring of the amount of material removed along the machining path. In a preferred embodiment, the unit observation length is configurable, so that it can be adapted to the specific application.

The setting of the unit observation length is made by the user or is made automatically, for instance based on the geometric tolerances for the current machining. Typically dL is set to 0.01 mm. The unit observation length can be set to any positive value, however if it is excessively small, then the value representing the material removed along the machining path will be very noisy. Opposite, if it is excessively large, an abnormal material removal will not be revealed because the value representing the material removed along the machining path is filtered. If the user sets a too small unit observation length at beginning, resulting in too noisy recorded data, he can retroactively increase dL until he finds an appropriate setting. Different unit observation lengths could be set depending on different areas of the machined profile.

The present invention comprises a second step in which at least one process signal which is representative of an amount of material removed by at least one discharge and the position (X;Y) of said at least one discharge are continuously acquired. Said at least one process signal is acquired and, implicitly, stored along with the advancing machining path, together with the position (X;Y) of said at least one discharge. In this way the positions (X;Y) of the at least one discharge can be associated to a specific unit observation length.

Lastly, the present invention comprises a third step in which, based on said at least one process signal and one or more properties of a current machining, a cumulated amount of material removed per unit observation length along a machining path is determined, including amounts of material removed by travelling in a forward cutting direction and amounts of material removed by travelling in a reverse cutting direction.

In other words in this third step the at least one process signal is stored and cumulated per unit observation length, and then the cumulated amount of material removed per unit observation length is determined based on the cumulated at least one process signal and the said one or more properties of the current machining. For instance, the at least one process signal could be summed (the number of discharges) or integrated (the average machining current), or linearly compound with other ones.

In summary the method for the monitoring of a wire electrical discharge machining (WEDM) process according to the present invention comprises the steps of: setting a unit observation length for the signal acquisition; continuously acquiring at least one process signal which is representative of an amount of material removed by at least one discharge and the position (X;Y) of said at least one discharge and cumulating said at least one process signal per unit observation length along a machining path; determining, based on said cumulated process signal per unit observation length and one or more properties of a current machining, the cumulated amount of material removed per unit observation length along a machining path, including amounts of material removed by travelling in a forward cutting direction and amounts of material removed by travelling in a reverse cutting direction.

In an embodiment, the method for the monitoring of a wire electrical discharge machining (WEDM) process comprises four steps, including the same steps 1 and 2 discussed here above, and further a step 3 and a step 4, as follows:

The first step features the setting of a 'unit observation length' dL (quantum of length) for the signal acquisition.

The second step features the continuous acquisition of at least one process signal which is representative of an amount of material removed by at least one discharge and the position (X;Y) of said at least one discharge.

The third step consists in the determination of the amount of material removed by the at least one discharge based on the acquired at least one process signal, and based on one or more properties of a current machining. The properties of a current machining include the properties of a current workpiece, and the properties of a current wire electrode. The properties of a current workpiece include thermo-physical properties of the workpiece material that determine the amount of material removed by a discharge, such as the melting point and the thermal conductivity of the material. The properties of the wire electrode include the wire electrode material, including core and coating material, the wire electrode diameter, etc. The properties of a current machining further include generator settings, flushing conditions, etc.

Lastly in the fourth step a cumulated amount of material removed per unit observation length along a machining path is determined, where said cumulated amount includes amounts of material removed by travelling in a forward cutting direction and amounts of material removed by travelling in a reverse cutting direction. Here the amounts of material removed in each unit observation length are determined in consideration of the position along the machining path, by adding the amounts removed in the normal forward cutting direction to the amounts of material removed by travelling in a reverse cutting direction, typically due to a controlled retracting movement (due to e.g. a short circuit), and further by adding the amounts of material removed by additional forward cutting up to the position where the cutting direction has been inverted.

In this way the cumulated amount, that is, the total amount of material removed at each position along the machining path is exactly determined.

Thus this embodiment has an intermediate step (step 3) in which the at least one process signal is used to immediately compute of the amount of material removed at each unit observation length, and cumulated amounts of material including amounts of material removed by travelling in a forward cutting direction and amounts of material removed by travelling in a reverse cutting direction are then computed in step 4.

In a preferred embodiment, the invention further comprises continuously acquiring and, implicitly, storing the position of at least one discharge along the engagement line of wire and workpiece. In other words, the above-mentioned second step of the invention is extended by collecting also the vertical discharge positions. The method used to determine the position of a discharge along the engagement line is disclosed for instance in application EP17187254.2. In substance, the method includes subtracting (I20−I30) and adding (I20+I30) the intensities of the currents flowing respectively in each of an upper and a lower line from generator to the upper and to the lower current feeder used to feed the current to the wire electrode. The quotient of the subtraction by the addition ((I20−I30)/(I20+I30)) provides a value which is proportional to the position of the discharge along the wire. By detecting the position of the discharges along the engagement line of wire electrode and workpiece and by monitoring the distribution of the discharges, a change of machining height can be easily identified. Such change of machining height may be due to a step or an aperture in the workpiece. With a lower machining height the amount of material to be removed per unit length is also less, thus the change in machining height may generate excessive material removal. By monitoring the distribution of the discharges as explained above, an excessive material removal can be motivated or actually suppressed by adaptation of process parameters, f.i. offset, pulse frequency, etc.

Thus, the at least one process signal which is representative of an amount of material removed by at least one discharge is continuously acquired together with the current position in space, that is along the machining path and along the engagement line of wire and workpiece. In this way a defect can be represented not only along the machined path, but more precisely, by indicating the vertical position of a defect along the machined profile.

In an embodiment of the inventive method for the monitoring of a WEDM process the cumulated amount of material removed per unit observation length along the machining path is determined for at least one individual machining pass. The WEDM machining is made with one or more passes, including a main cut by which the raw geometry of the machining is produced, and typically at least one trim cut, which provides an improved surface quality and desired dimension. Thus, the cumulated amount of material removed is preferably determined with each pass of the machining. In this way, the individual pass and the progress of the machining can be monitored pass by pass. The cumulated amount of material removed per unit observation length along the machining path of one or more passes can be summed, to provide the picture of the total cumulated amount of material removed per unit observation length along the machining path with the already executed passes.

In an embodiment of the invention the cumulated amount of material removed per unit observation length along the machining path is represented, for instance on a display of the WEDM machine or other display in the production environment, providing immediate visual information about the progress of the current machining.

The machining path can either be represented by the curvilinear abscissa or by the positions (X;Y). In specific cases, the same position (X;Y) can refer to different curvilinear abscissas, for instance in case of a back and forward programmed machining in a slot. In this case, using the coordinates (X;Y) for the representation of the amount of material removed along the coordinates would be unclear. The use of the curvilinear abscissa as reference for the amount of material removed excludes any confusion.

In a preferred embodiment of this invention, the curvilinear abscissa will be the reference to follow the machining path to avoid any confusion.

In an embodiment, the cumulated amount of material removed per unit observation length along the machining path is represented as a graph, along a curvilinear abscissa of the machining path. This means that the arbitrarily shaped or curved machining path is unfolded and straightened to become the abscissa of a Cartesian graph, so that the representation of the amount of material removed per unit observation length and comparison with one or more tolerances becomes very simple, as shown on FIG. 3a.

According to an alternative embodiment, the cumulated amount of material removed per unit observation length along the machining path is represented along the geometry of machining in the X/Y plane (2D). Here the machined profile is used as zero reference and cumulated amount of material removed per unit observation length is indicated at the corresponding position along the geometry of machining in an X/Y plane, as shown on FIG. 3b. In this way the material removal amounts can be easily correlated with geometric features of the machining. The linking of the geometry of machining provides an added value, for instance in that the position of a defect along the machining path is highlighted.

According to a further alternative embodiment, the cumulated amount of material removed per unit observation length along the machining path is represented along the geometry of machining in an X/Y/Z space (3D). Here again, the machined profile is used as zero reference and cumulated amount of material removed per unit observation length is indicated at the corresponding position along the machined profile, but here in the X/Y/Z space. The 3D representation of the cumulated amount of material removed per unit observation length is particularly useful in combination with the previously described method to determine the position of a discharge along the engagement line of wire and workpiece.

It goes without saying that in all above mentioned embodiments used to represent the cumulated amount of material removed per unit observation length along the machining path the scale is suitably adapted, to enhance visibility and appraisal of the cumulated amount of material removed per unit observation length along the machining path, and variations of such amounts along the machining path.

In another embodiment of the invention the at least one process signal which is representative of an amount of material removed by at least one discharge is represented, for instance on a display of the WEDM machine or other display in the production environment, providing immediate visual information about the current machining. Displaying the at least one process signal provides similar information to the displaying of cumulated amount of material removed discussed in previous embodiments, because the cumulated amount of material removed is derived from the at least one process signal.

In another embodiment of the invention the cumulated amount of material removed per unit observation length is determined and/or displayed either after one or more unit observation lengths, or after a latency decision distance, or after an ISO (International Organization for Standardization) program block, or after a machining pass, or after the last machining pass of a machining, or offline.

The most appropriate method for a specific machining depends on various factors. For instance, with a machining with critical conditions and presence of human during the process, the cumulated amount of material removed per unit observation length is preferably determined and displayed in real- or near-real-time, whereas with an established production process the amounts removed are preferably determined and/or displayed at the end of the machining, after the last machining pass of a machining or offline.

Determining and/or displaying the cumulated amount of material removed per unit observation length in real- or near-real-time ensures that the operator is notified immediately. In case of a fault during a machining pass, determining and/or displaying the cumulated amount of material removed per unit observation length at the end of each pass allows the operator to adapt machining before the next pass. For traceability reasons, the determination and/or the display can be done at the end of the whole machining.

Specifically, according to an embodiment, the cumulated amount of material removed per unit observation length is determined and/or displayed after a delay called the latency decision distance. In order to be able to determine the cumulated amount of material removed per unit observation length, by adding the amounts removed in normal forward and reverse cutting direction, a delay in space is required. To take into account any backward motion along the whole machining path and to correctly determine the cumulated amount of material, display can then only be done after the end of the pass; in this case the latency decision distance would be equal to the whole length of the machining path. In order to display cumulated amount of material removed per unit observation length in real- or near-real-time, the latency decision distance has to be set at a smaller value. Thus the latency decision distance defines the maximal backward distance on the machining path during which material removal can still be evaluated by the computation. If the retract exceeds the latency decision distance, displayed cumulated amount of material removed per unit observation length would be incomplete.

If backward movements do not exceed the latency decision distance, then the material removal is cumulated and correctly displayed at the output. If for some reason the backwards movement exceeds the set latency decision distance it would be possible to discern the overstepping of the latency decision distance and to warn the user with a message and/or to update/correct the output of the material removal behind the latency decision distance. It is thus important not to underestimate the longest expected backwards movement (which is executed with generator on) along the machining path, respectively to correctly size the latency decision distance for a correct representation of the amounts of removed material.

As said for a correct near-real time representation of the cumulated amount of material removed per unit observation length the latency decision distance must be set such as to include the largest expectable backward motion (with generator on) of the wire electrode along the machining path. Preferably said latency decision distance is thus configurable. Its typical length is 0.2 mm. In general latency decision distance is preferably longer when tendency to a backward movement is high for some reason, e.g. with high workpieces.

Alternatively, if there is no need for a near-real time or real-time output of the cumulated amount of material removed per unit observation length, then one can record all the amounts of material removed per unit observation length along the whole machining pass and output the data pairs once the pass has been completed, or at a later time, for instance for an offline processing.

This can be achieved by setting desired options or by appropriate setting of the latency decision distance. For instance by setting a very high value, typically longer than the machining path, the data pairs are output at the end of a pass. Opposite if one wants the data points to be output in real time, he can set latency decision distance to zero. Any intermediate value will introduce a delay in space and thus in time, where said time delay depends on the latency decision distance and the machining speed.

According to an embodiment the WEDM machine has a control unit, the control unit comprises a buffer to collect the amounts of material removed per unit observation length along all machining passes, for all traversed unit observation lengths.

According to a preferred embodiment of the invention the amount of material removed per unit observation length along the machining path is determined either continuously, in adjacent unit observation lengths along the machining path, or periodically, in monitored sectors including a plurality of adjacent unit observation lengths separated by unmonitored sectors along the machining path in which the amounts are not determined, or selectively, in a plurality of adjacent unit observation lengths of one or more (predefined) sectors along the machining path.

According to the present invention, a sector is a limited part of a machining path, delimited by a start point and by an endpoint. Start point and endpoint can be at any position of the path and/or any position of the ISO-program block.

By providing a number of options the determination of removed material amounts can be limited to the sectors of interest along the machining path. This makes sense in particular where only a part of the machining is to be inspected or traced.

According to a preferred embodiment of the invention the cumulated amount of material removed along the machining path is represented either as a volume (mm³), or as an area (mm²), or as a thickness (mm). The material removal along the machining path can be represented as a volume (mm³) determined by the height of the workpiece $h_{WP}$ multiplied by the thickness of material removed laterally (normal to the cutting direction) and multiplied by the unit observation length. Indeed the amount of material removed is a volume. However since the unit observation length is preset, the amount of material removed can be displayed as an area (mm²) by dividing it by dL. Moreover, if the workpiece height $h_{WP}$ is known, the amount of material removal along the path can be represented as a thickness, expressed in mm.

In a preferred embodiment the process signal which is representative of an amount of material removed by at least one discharge includes one or more of: the total number of discharges, the number of normal discharges, the number of short circuit discharges, the machining speed, the ignition delay time, the average machining voltage, the average machining current, the partial currents flowing respectively in each of an upper and a lower line from generator to the upper and to the lower current feeder and a value derived from one or more of the just named process signals. Representative of an amount of material removed means can be determined on the base of one or more process signals, for instance on the base of the average machining current.

In a preferred embodiment above mentioned process signals are used to provide a pulse classification, where that discharge pulses are classified in two or more pulse classes based on at least one process signal. The pulse classification may serve for instance to discriminate material removal of various discharge pulses. For instance, the classified discharge pulses are cumulated per unit observation length, and the cumulated amount of material removed per unit observation length along a machining path is computed, including amounts of material removed by travelling in a forward cutting direction and amounts of material removed by travelling in a reverse cutting direction.

In a preferred embodiment for the monitoring of a WEDM process a tolerance for the amount of material to be removed per unit observation length is determined for one or more machining passes of the machining, so that the amount of material removed per unit observation length can be compared with that tolerance value. A tolerance is set, for instance, to monitor a minimum amount of material which has to be removed in a pass; it is to ensure that the HAZ generated by the previous machining pass is substantially removed by the current pass. to monitor a maximum amount of material to be removed in a pass; it is to be avoided that an excessive amount of material is removed somewhere along the path with the machining parameters of the current pass, because successive passes are conducted with progressively lower energy so that it may be impossible to remove the HAZ generated by the previous pass, if the amount of material removed in said previous pass was excessive. Another tolerance is set, for instance, by calculating the theoretical material removed per unit observation length. This theoretical mean value of the amount of material removed per unit observation length along the machining path can be multiplied by a factor and/or filtered to form the tolerance.

Preferably the amount of material removed per unit observation length along the machining path in a current machining pass is compared with one or more tolerances for the current machining pass.

In a further embodiment a plurality of tolerances are determined. Preferably one or more tolerances are set for each machining pass. Preferably the one or more tolerances representing a maximum amount or a minimum amount of material to be removed in a pass is computed on the base of the mean value of the amounts of material removed per unit observation length along the machining path during one or more earlier identical machining, respectively one or more earlier identical machining passes. In addition, each new identical machining or machining pass is added to enhance the significance of the mean value.

In a preferred embodiment said comparison is used for a quality assessment. Amounts of material removed per unit observation length along the machining path exceeding said one or more tolerances are marked along the machining path.

In a preferred embodiment the amounts of material removed per unit observation length along the machining path exceeding a maximum tolerance or falling below a minimum tolerance are represented either in a graph along a curvilinear abscissa of the machining path, or along a geometry of machining in the X/Y plane (2D), or along the geometry of machining in the X/Y/Z space (3D). In this way unit observation lengths in which the amounts of material removed exceed a tolerance are easily identified by the staff and possibly defective unit observation lengths are highlighted, for immediate assessment but also for traceability. Preferably, one or more tolerances are also displayed.

In a preferred embodiment one or more passes are repeated or process parameters of one or more subsequent passes are modified, or the workpiece is discarded if it is determined that a tolerance is exceeded, respectively underrun.

Now some aspects of the invention are explained in more detail. First, a method for the determination of the amount of material removed from the workpiece is explained. Basically in this method the amount of material i.e. the volume removed by an individual discharge is determined or estimated and discharges are counted to determine overall material removal. Typically, the discharges are classified, for instance distinguishing at least a normal discharge type from a short circuit discharge type, so that the amount of material removed by the respective discharge type is duly considered. A short circuit discharge, hereinafter referred to as 'short discharge' is a discharge which is classified as such based on certain short circuit recognition methods, such as an erosion voltage which is below a predefined erosion voltage threshold, an immediate discharge in which the voltage does not exceed an idle voltage threshold before breakdown, etc. A 'short discharge' is typically applied with a reduced current with respect to a 'normal discharge', to avoid wire break and damage to the workpiece. The pulse classification can be refined on the basis of the above-mentioned and further criteria, so that the amount of material removal of the respective pulse type can be determined more accurately. Every discharge participates to the WEDM process with a volume of material removed corresponding to the volume removed by that type of discharge. By counting the number of short discharges and the number of normal discharges it is possible to better determine the cumulated amount of material removed, for instance for a certain number of discharges, along a unit observation length, along a sector of the machining path, along one or more passes of the entire path.

For instance, a number "N" of sparks (i.e. discharges), will remove the following volume:

$$\text{Volume} = \sum_{i=1}^{N} v_i,$$

where $v_i$ is the volume eroded by discharge i.

For a number of N sparks divided in a number T of types, acquired during the observation period, we can compute the entire volume as follows:

$$\text{Volume} = \sum_{j=1}^{T} n_j \cdot vf_j,$$

$n_j$=number of sparks of type j,
$vf_j$=volume removed by an individual spark of type j The volume $vf_j$ of material removed by an individual spark of type j is identified by means of a thermal model or by means of single discharge experiments. The volume $vf_j$ of material removed by an individual spark of type j is identified ahead, before computing the cumulated volume by a number of sparks. The volume $vf_j$ removed by an individual discharge depends typically on the shape of the discharge pulse, the machining current amplitude, pulse duration, gradient of rising and falling flank of the discharge pulse, discharge type, workpiece material and wire electrode.

Another way for the determination of the amount of material removed from the workpiece is to measure the mean machining current $I_{eros}$:

$$\text{Volume} = K_{eros} \cdot \int I_{eros} \cdot dt,$$

where $K_{eros}$ is a constant, which essentially depends on the material pairing, i.e. wire electrode material and diameter, and workpiece material. The unit of $K_{eros}$ is [mm³/(A*s)].

The above volume is the amount of material removed during the observation period. To get a more usable metric, the removed area is preferably defined in relation to the unit observation length dL:

$$RemovedArea \ [\text{mm}^2] = \frac{K\_eros}{dL} \cdot \int_{t \in dL} I_{eros} \cdot dt$$

The removed area can also be formulated as a function of the number of sparks:

$$RemovedArea \ [\text{mm}^2] = \frac{1}{dL} \cdot \sum_{j=1}^{T} n_j \cdot vf_j$$

Knowing the workpiece height on this dL, one can deduce the thickness, in other words, the lateral removal, as follows:

$$LateralRemoval \ [\text{mm}] = \frac{RemovedArea \ [\text{mm}^2]}{\text{Height [mm]}}$$

With this formula, it is assumed that the material removal is uniform along the height of the part. In a preferred embodiment, the variation of the material removal along the height of the workpiece is taken into account by detecting the position of the discharges along the engagement line of wire electrode and workpiece, using the partial currents method.

Here above we have considered a machining in a forward direction only. But if feeding direction is inverted for some reason so that wire electrode is made to move backwards for a while, and then forward again, then it is required to cumulate the amounts of material removed, adding the amounts of material removed at same position. In such case, for a 'unit observation length' dL, a first forward contribution, then a backward contribution, and lastly, a further forward contribution are to be added.

If several inversions overlap, the principle remains and each spark occurring on the unit observation length removes corresponding amount of material and is added to the previously removed material on this unit observation length.

The present invention acquires and stores data pairs including the position and the amount of material removed, for each unit observation length dL along the machining path, so that this quantity can be displayed respectively used for further data processing.

The axis positions are determined by the machining program, and positions (X;Y) are allocated to the corresponding unit observation length along the curvilinear abscissa of the machining path.

The amount of material removed per unit observation length along the machining path is a volume, and can be represented as an area or as a thickness. Typically, the data pairs are continuously collected over the entire machining, but it is also possible to define a limited section of the machining path where data pairs shall be recorded.

BRIEF DESCRIPTION OF THE DRAWINGS

Embodiments of the invention are now described, by way of example, and with reference to the accompanying drawings, in which.

Figure 1:
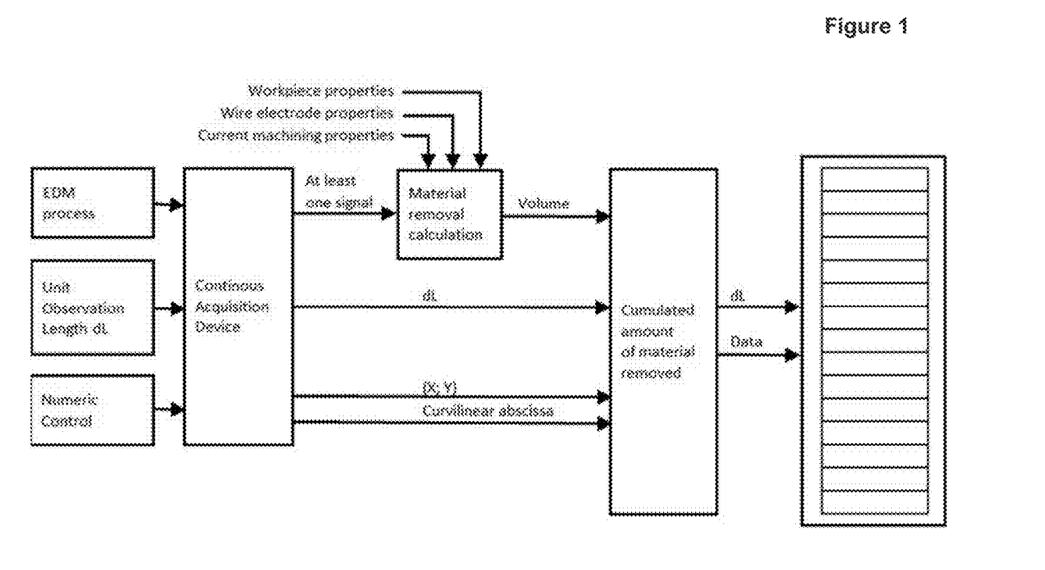
FIG. 1 is a block diagram, representing the interaction of the elements of the invention.

FIG. 1 shows a block diagram to illustrate an exemplary implementation of the buffer. The Continuous Acquisition Device receives the Unit Observation Length, and is connected to the EDM process and to the Numeric Control. The Continuous Acquisition Device outputs a process signal which is representative of an amount of material removed by at least one discharge, the dL, the (X; Y) position, as well as the curvilinear abscissa. The Unit Observation Length is an input data for the Continuous Acquisition Device.

Figure 2:
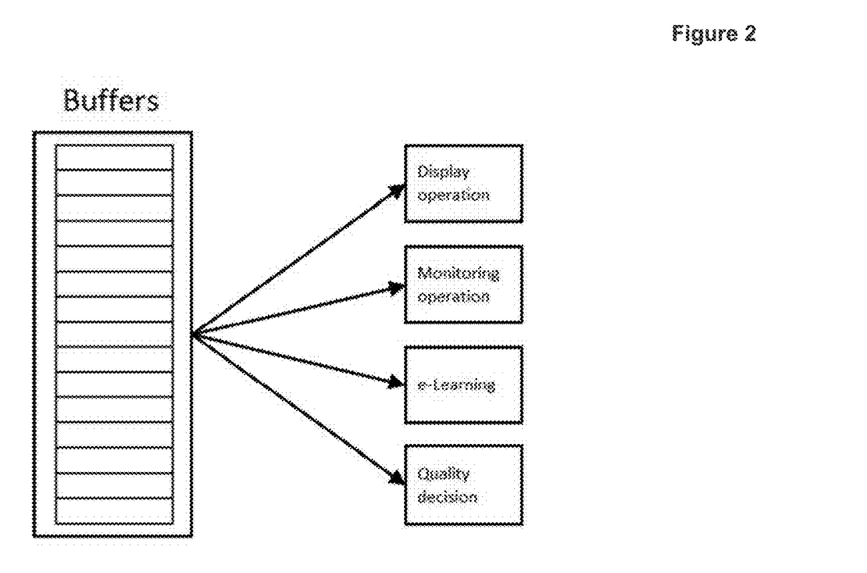
FIG. 2 is a block diagram, showing the usage of stored data.

Depending on the process signal, the workpiece properties, the wire electrode properties and the current machining properties, the block "material removal calculation" computes the volume of the removed material. Then the block "Cumulated amount of material removed" computes for each dL, the total material removal, and the associated (X;Y) position. As said, alternative solutions are possible; for example cumulating the at least one signal before computing the volume of removed material per dL. Finally, this information is stored in a Buffer which is dimensioned in function of the actual number of unit observation lengths dL. FIG. 2 illustrates how the Buffers are used.

FIG. 2 is block diagram, which illustrates the possible usage of the computed amounts of material removed. For example one can simply display the material removal in near real-time. It is also possible to execute a monitoring operation, typically for traceability purposes. The data in the Buffer may also be used for automatically learn the behavior of machining along the path. Obtained material removal can also be used for a quality decision purpose.

Figure 3A:
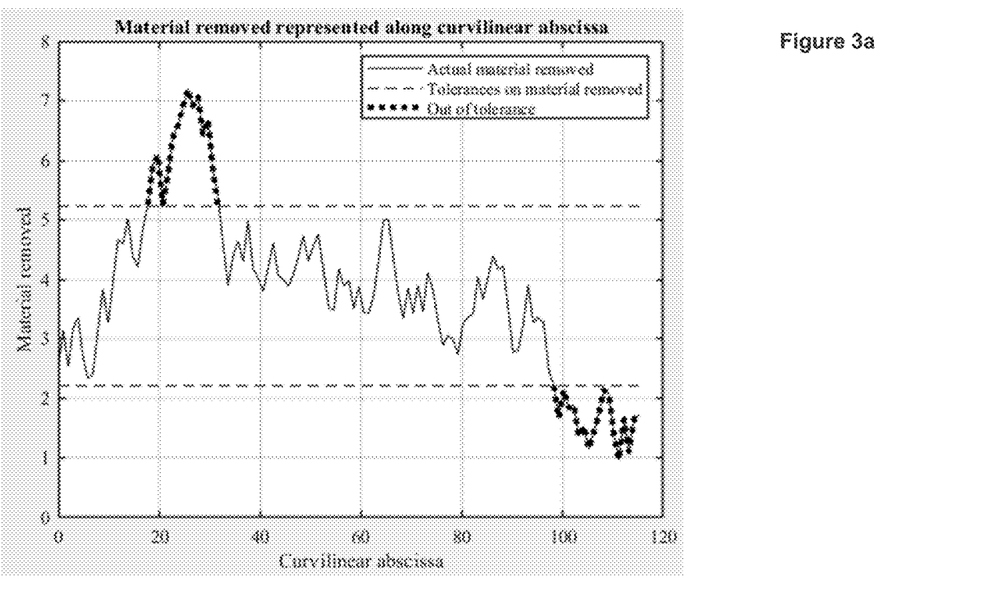
FIG. 3a is a graphical representation of the material removed along the curvilinear abscissa.

FIG. 3a shows an exemplary graphical representation of the cumulated amount of material removed along a machining path, according to the present invention. The cumulated amount of material removed per unit observation length is represented along the curvilinear abscissa of the machining path (arbitrary units). Thus, here the machining path has been "unfolded and straightened" to become the abscissa of the graph. The graph includes a tolerance to monitor the minimum- and the maximum amount of material which has to be removed at every unit observation length along the curvilinear abscissa of the machining path.

Figure 3B:
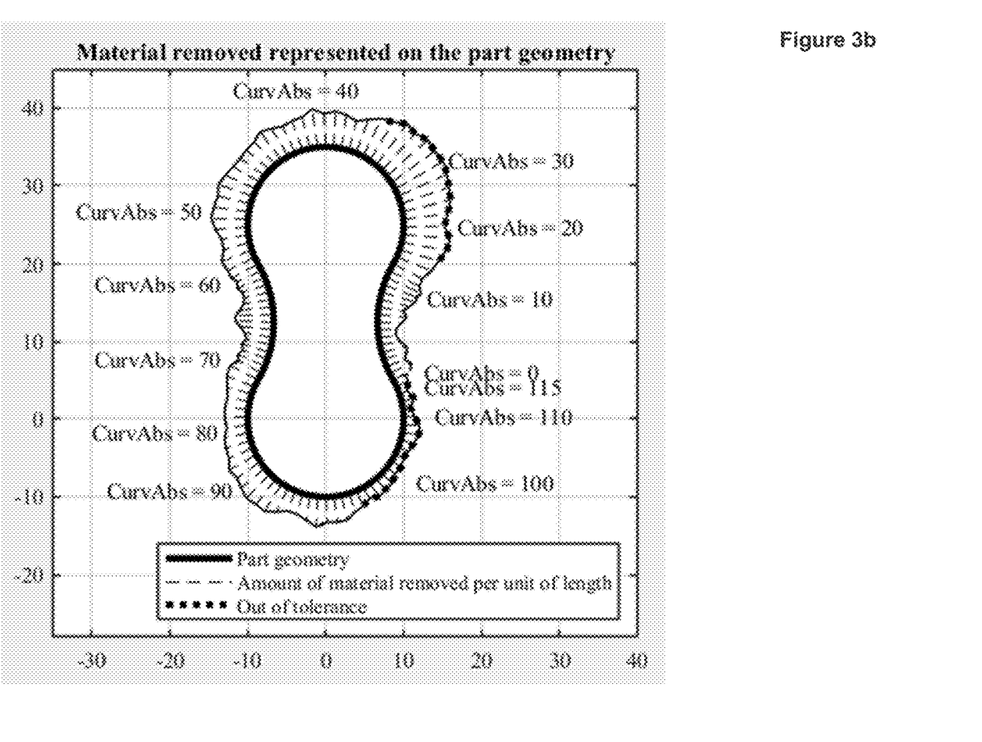
FIG. 3b is a graphical representation of the material removed along the X/Y.

FIG. 3b shows an alternative exemplary graphical representation of the cumulated amount of material removed along a machining path, according to the present invention. The cumulated amount of material removed per unit observation length is represented along geometry of the part (arbitrary unit).

Advantageously the two graphical representations are made available to the user. The representation along the curvilinear abscissa according FIG. 3 provides an immediate information on whether the machining is within the tolerance and uniformity, whereas the representation along the part geometry provides an immediate association of variations to the geometric features of the machining.

Figure 4A:
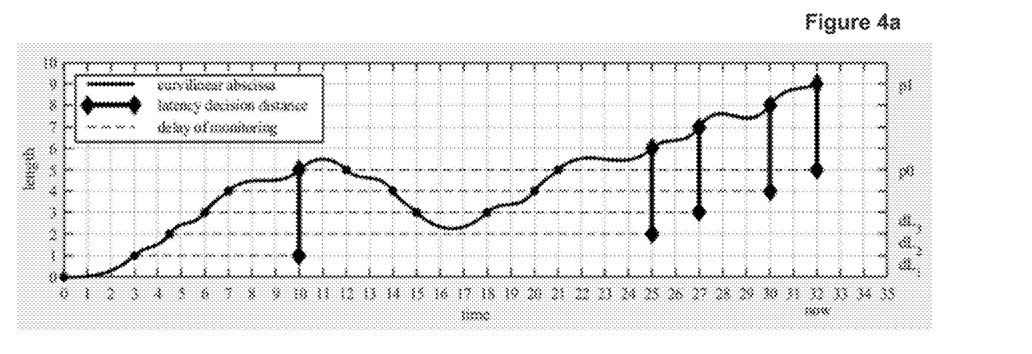
FIG. 4a is a graph showing the effect of the latency decision distance.

FIG. 4a shows an example of the evolution of the curvilinear abscissa of the machining path over the time. The graph includes the latency decision distance and projection on the curvilinear abscissa.

Figure 4B:
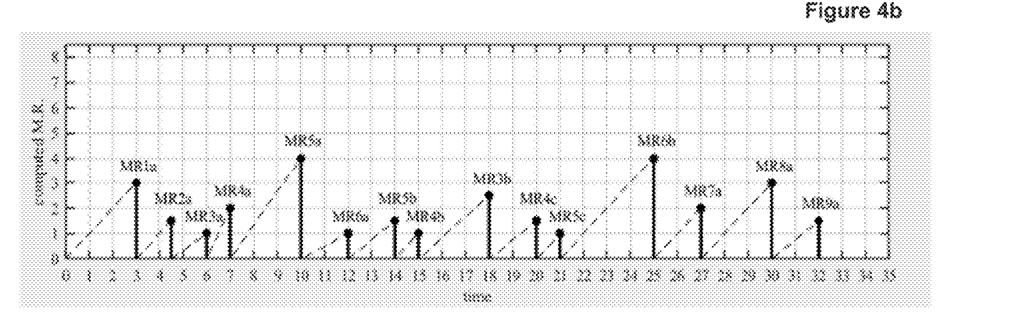
FIG. 4b is a graph showing the effect of the latency decision distance.

FIG. 4b shows an example of computation of Material Removed (computed M.R.), before its buffering (see FIG. 1). Computed material removed for first unit observation length dL ($dL_1$) is called MR1a, and in the same way MR2a is the material removed of dL2. When a retracting along the curvilinear abscissa occurs, several M.R. are computed, for example, for dL4, 3 M.R. are computed which are called MR4a (forward cutting), MR4b (retracting), and MR4c (return to forward direction).

Figure 4C:
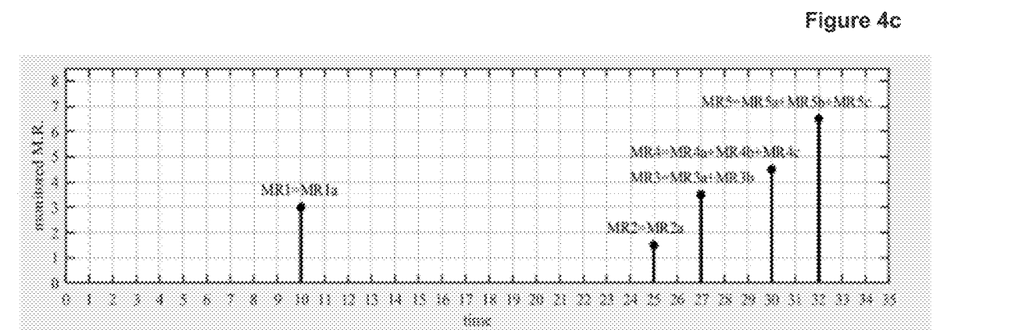
FIG. 4c is a graph showing the effect of the latency decision distance.

FIG. 4c shows what is output from the buffer (monitored M.R.), delayed in space by the latency decision distance, until time=now.

$P_1$, and $P_0$ are positions on the machining path (curvilinear abscissa), such that:

$P_1$ is the farthest reached position.

The distance $[P_0; P_1]$ being the set latency decision distance.

In this case the monitored M.R. can be displayed for any position before $P_0$, before complete machining of the current pass. In this way a near-real time representation of the currently removed amount of material is possible; the actual delay can be observed between monitored M.R. and computed M.R. (for instance dashed line on first axis, between time=3 and time=10).

The invention claimed is:

1. A method for the monitoring of a wire electrical discharge machining (WEDM) process, the method comprising:
    setting a unit observation length for the signal acquisition,
    continuously acquiring at least one process signal which is representative of an amount of material removed by at least one discharge and the position (X;Y) of said at least one discharge,
    determining, based on said at least one process signal and one or more properties of a current machining, a cumulated amount of material removed per unit observation length along a machining path, including amounts of material removed by travelling in a forward cutting direction and amounts of material removed by travelling in a reverse cutting direction.

2. A method for the monitoring of a wire electrical discharge machining (WEDM) process according to claim 1, the method further comprising:
    setting a unit observation length for the signal acquisition,
    continuously acquiring at least one process signal which is representative of an amount of material removed by at least one discharge and the position (X;Y) of said at least one discharge,
    determining an amount of material removed by the said at least one discharge, based on said at least one process signal and one or more properties of a current machining,
    determining a cumulated amount of material removed per unit observation length along a machining path, including amounts of material removed by travelling in a forward cutting direction and amounts of material removed by travelling in a reverse cutting direction.

3. A method for the monitoring of a WEDM process according to claim 1, wherein the method further comprises continuously acquiring the position of said at least one discharge along the engagement line of wire and workpiece.

4. A method for the monitoring of a WEDM process according to claim 1, wherein the cumulated amount of material removed per unit observation length along the machining path is determined for at least one individual machining pass.

5. A method for the monitoring of a WEDM process according to claim 1, wherein the cumulated amount of material removed per unit observation length along the machining path is represented either
- In a graph, along a curvilinear abscissa of the machining path, or
- along a geometry of machining in the X/Y plane (2D), or
- along the geometry of machining in the X/Y/Z space (3D).

6. A method for the monitoring of a WEDM process according to claim 5, wherein the at least one process signal which is representative of an amount of material removed by at least one discharge is represented (displayed) either
- In a graph, along a curvilinear abscissa of the machining path, or
- along a geometry of machining in the X/Y plane (2D), or
- along the geometry of machining in the X/Y/Z space (3D).

7. A method for the monitoring of a WEDM process according to claim 1, wherein the cumulated amount of material removed per unit observation length is determined and/or displayed
- after one or more unit observation lengths, or
- after a latency decision distance, or
- after an ISO (International Organization for Standardization) program block, or
- after a machining pass, or
- after the last machining pass of a machining, or
- off line.

8. A method for the monitoring of a WEDM process according to claim 1, wherein the unit observation length and/or the latency decision distance is configurable.

9. A method for the monitoring of a WEDM process according to claim 1, wherein the amount of material removed is determined either:
- Continuously, in adjacent unit observation lengths along the machining path, and/or
- Periodically, in sectors including a plurality of adjacent unit observation lengths separated by sectors along the machining path in which the amounts are not determined, and/or
- Selectively, in a plurality of adjacent unit observation lengths of one or more (predefined) sectors along the machining path.

10. A method for the monitoring of a WEDM process according to claim 1, wherein the cumulated amount of material removed along the machining path is represented as
- a volume ($mm^3$) being the part height multiplied by the lateral removal and said unit observation length, or
- an area ($mm^2$) being the part height multiplied by the lateral removal, or
- a thickness (mm) being the lateral removal.

11. A method for the monitoring of a WEDM process according to claim 1, wherein the at least one process signal includes one or more of,
- the total number of discharges,
- the number of normal discharges,
- the number of short discharges,
- the machining speed,
- the ignition delay time,
- the average machining voltage,
- the average machining current,
- the partial currents flowing through to the upper and to the lower current feeder,
- a value derived from one or more of the above process signals.

12. A method for the monitoring of a WEDM process according to claim 1, wherein a tolerance for the maximum amount and/or the minimum amount of material to be removed per unit observation length is determined for one or more machining passes of the machining, and that the amount of material removed per unit observation length along the machining path in an current machining pass is compared with the tolerance.

13. A method for the monitoring of a WEDM process according to claim 12, wherein said comparison is used for a quality assessment, and that amounts of material removed per unit observation length along the machining path exceeding a tolerance for the maximum amount of material to be removed in a pass and/or falling below a minimum tolerance for the amount of material to be removed in a pass are marked along the machining path.

14. A method for the monitoring of a WEDM process according to claim 12, wherein the amounts of material removed per unit observation length along the machining path exceeding said reference envelope are represented (displayed) either
- In a graph, along a curvilinear abscissa of the machining path, or
- along a geometry of machining in the X/Y plane (2D), or
- along the geometry of machining in the X/Y/Z space (3D).

15. A method for the monitoring of a WEDM process according to claim 14, wherein the representation includes representation of one or more tolerances.

* * * * *